US007332046B2

(12) United States Patent
Eubanks et al.

(10) Patent No.: US 7,332,046 B2
(45) Date of Patent: Feb. 19, 2008

(54) METHODS OF BLOCKING STAINS ON A SUBSTRATE TO BE PAINTED, AND COMPOSITES SUITABLE FOR USE IN SUCH METHODS

(75) Inventors: Eurell Thomas Eubanks, Lyman, SC (US); Charles Givan Ruffner, Jr., Kingsport, TN (US); Mark Dwight Clark, Kingsport, TN (US); Edward Enns McEntire, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/672,965

(22) Filed: Sep. 26, 2003

(65) Prior Publication Data

US 2005/0069698 A1 Mar. 31, 2005

(51) Int. Cl.

| | |
|---|---|
| ***B44C 1/20*** | (2006.01) |
| ***B29C 65/00*** | (2006.01) |
| ***B32B 37/00*** | (2006.01) |
| ***E04G 21/00*** | (2006.01) |
| *E04F 13/00* | (2006.01) |
| *B32B 27/00* | (2006.01) |

(52) U.S. Cl. ........................ 156/71; 156/230; 156/234; 156/278; 52/746.1; 427/402

(58) Field of Classification Search ................ 427/140, 427/258–260, 272, 282, 402; 29/402.09; 52/745.05, 745.06, 745.17, 746.1; 156/71, 156/94, 230, 234, 237, 247, 249, 278, 280; 428/40.1, 41.5, 41.7, 41.8, 904.4, 44, 46–48; 162/120, 122, 188

See application file for complete search history.

(56) References Cited

U.S. PATENT DOCUMENTS 2,614,521 A * 10/1952 Eida .......................... 118/714

(Continued)

FOREIGN PATENT DOCUMENTS

DE 2 492 279 A 4/1982

(Continued)

OTHER PUBLICATIONS

Willy Peterson, Green Paint Standards, Time for A Change, Paint & Coatings Industry, 2000, vol. 16, No. 5, p. 40.

(Continued)

*Primary Examiner*—Philip Tucker
*Assistant Examiner*—Sing P. Chan
(74) *Attorney, Agent, or Firm*—Polly C. Owen; Bernard J. Graves, Jr.

(57) ABSTRACT

Methods of blocking stains on a substrate to be painted are disclosed, as are stain-blocking composites that are useful according to the disclosed methods. In a broad aspect, the methods include the steps of contacting a stained portion of the substrate with a dry film layer; applying pressure to the dry film layer to cause the dry film layer to adhere to the stained portion of the substrate and to at least a portion of the substrate adjacent the stained portion of the substrate; and subsequently coating the dry film layer and the adjacent substrate with one or more additional liquid coating layers. Stain blocking composites useful according to the methods described include a release layer, to which the pressure is applied; a dry film layer, that can be clear or pigmented, that serves to block the stain; and an optional adhesive layer, intended to assist in adhering the dry film layer to the stained portion of the substrate and to at least that portion of the substrate adjacent the stained portion of the substrate.

24 Claims, 1 Drawing Sheet

U.S. PATENT DOCUMENTS

| | | | |
|---|---|---|---|
| 3,432,376 A | | 3/1969 | Reed et al. |
| 3,510,385 A | | 5/1970 | Lythgoe et al. |
| 3,515,572 A | | 6/1970 | Dabisch |
| 3,640,791 A | | 2/1972 | Rosenheim |
| 3,679,506 A | | 7/1972 | Burgess et al. |
| 3,852,089 A | | 12/1974 | Barouh et al. |
| 3,857,718 A | | 12/1974 | Shank |
| 3,928,710 A | | 12/1975 | Arnold et al. |
| 4,209,865 A | * | 7/1980 | Kozlowski ..................... 7/105 |
| 4,263,077 A | | 4/1981 | Rampelberg |
| 4,289,670 A | | 9/1981 | Creekmore et al. |
| 4,451,522 A | | 5/1984 | de Vroom |
| 4,497,851 A | | 2/1985 | de Vroom |
| 4,676,861 A | | 6/1987 | Bishop |
| 4,766,038 A | | 8/1988 | de Vroom |
| 4,950,536 A | | 8/1990 | Hogarth et al. |
| 5,231,118 A | | 7/1993 | Hogarth et al. |
| 5,310,437 A | | 5/1994 | Tucker |
| D355,934 S | | 2/1995 | Oga et al. |
| 5,393,368 A | | 2/1995 | Stevens |
| 5,700,552 A | | 12/1997 | Katsuro et al. |
| 5,714,035 A | | 2/1998 | Stevens |
| 5,750,234 A | | 5/1998 | Johnson et al. |
| 5,891,294 A | | 4/1999 | Shih et al. |
| 5,891,562 A | * | 4/1999 | Rutz et al. ............... 428/304.4 |
| 5,981,058 A | | 11/1999 | Shih et al. |
| 6,042,678 A | | 3/2000 | Johnson et al. |
| 6,162,492 A | * | 12/2000 | Narayanan .................. 427/140 |
| 6,210,796 B1 | | 4/2001 | Lobert et al. |
| 6,235,364 B1 | | 5/2001 | Katsuro et al. |
| 6,299,974 B1 | | 10/2001 | Shih et al. |
| 6,331,352 B1 | | 12/2001 | Bradley et al. |
| 6,352,770 B1 | | 3/2002 | Nienaber et al. |
| 6,399,193 B1 | | 6/2002 | Ellison |
| 6,423,778 B1 | | 7/2002 | McGee et al. |
| 6,500,509 B1 | | 12/2002 | Katsuro et al. |
| 6,551,432 B1 | | 4/2003 | Spain et al. |
| 6,607,621 B1 | * | 8/2003 | Swanson ..................... 156/94 |
| 2004/0159969 A1 | | 8/2004 | Truog et al. |
| 2004/0161566 A1 | | 8/2004 | Truog et al. |
| 2004/0161567 A1 | | 8/2004 | Truog et al. |
| 2004/0161568 A1 | | 8/2004 | Truog et al. |
| 2005/0069698 A1 | | 3/2005 | Eubanks et al. |

FOREIGN PATENT DOCUMENTS

| | | | | |
|---|---|---|---|---|
| DE | 100 18 103 A1 | | 10/2001 |
| EP | 0 230 364 A2 | | 7/1987 |
| EP | 0 530 838 A1 | | 3/1993 |
| EP | 0 230 364 B2 | | 9/1994 |
| EP | 1 053 793 A1 | | 11/2000 |
| FR | 2206365 | | 6/1974 |
| FR | 2 492 279 | | 4/1982 |
| GB | 2196580 A | * | 5/1988 |
| GB | 2205593 A | * | 12/1988 |
| JP | 02035977 | | 2/1990 |
| JP | 10219202 A | | 8/1998 |
| JP | 2000108591 A | | 4/2000 |
| SU | 313839 A | | 9/1971 |
| WO | WO 00/13893 A1 | | 3/2000 |
| WO | WO 00/22032 A1 | | 4/2000 |
| WO | WO 00/24576 A1 | | 5/2000 |
| WO | WO 00/41881 A1 | | 7/2000 |

OTHER PUBLICATIONS

Sandy Morrison, Getting Into Films, European Adhesives & Sealants, 2003, pp. 21-22.

Thomas M. Ellison, Stephen P. McCarthy, Arthur K. Delusky, Thermoplastic Paint, ANTEC, 2000, pp. 2607-2608.

Thomas M. Ellison, No-Emission Dry Paint Films, CHEMTEC, 1995, pp. 37-39.

R. A. Ryntz, Motor Vehicle Coatings: Current Trends for Coating Plastics II., Paint & Coatings Ind., 1997, vol. 13, No. 4, p. 72.

Marc S. Reisch, Paints & Coatings, Chem Eng News, 1996, vol. 74, No. 42, pp. 44-45.

O. Suter, A Self-Adhesive Dry Paint Film, Farbe Lacke, 1982, vol. 88, No. 10, pp. 823-824.

Notification of Transmittal of the International Search Report and the Written Opinion of the International Searching Authority or the Declaration dated Jun. 17, 2005.

Notification of Transmittal of the International Search Report and the Written Opinion of the International Searching Authority, or the Declaration date of mailing Jul. 10, 2006 received on the PCT filing of the co-pending U.S. Appl. No. 11/052,156.

Copending U.S. Appl. No. 11/052,156, filed Feb. 7, 2005.

* cited by examiner

METHODS OF BLOCKING STAINS ON A SUBSTRATE TO BE PAINTED, AND COMPOSITES SUITABLE FOR USE IN SUCH METHODS

FIELD OF THE INVENTION

The invention relates to the field of stain blocking, and more specifically, to methods of blocking stains on substrates to be painted. The invention further relates to stain blocking composites suitable for use according to the inventive methods.

BACKGROUND OF THE INVENTION

Attempts to cover stains and blemishes on architectural substrates to be painted have traditionally been performed using liquid paints or primers that are either solvent- or water-based. The use of liquid stain-blocking coatings, in general, has several disadvantages, some of which are disadvantages common to all liquid coating products, others of which are disadvantages specific to the use of these products to block the wide variety of stains that are known to occur.

Disadvantages that are common to most liquid coating products include the presence of volatile organic compounds (VOCs), the odor, the need for subsequent cleanup, and the drying time that is necessary prior to applying subsequent liquid coating layers. Disadvantages that are specific to the use of liquid coating products as stain blocking agents include those resulting from the interaction of the liquid coating with the stain while the coating is wet, as well as those arising from the interaction of the dried coating with the stain after the coating has dried, such as those that are known to occur when further liquid coating layers are applied.

A wide variety of stains are known to occur on substrates to be painted, making it difficult to select the proper liquid stain-blocking coating. Indeed, a liquid coating that is satisfactory to block all the various types of stains normally encountered has yet to be developed, due in part to the varying physicochemical properties of the various stains.

Typical stains for which stain blocking paints are used include inks, crayons, lipstick, grease pencils, smoke residue, tannins, and the like. These stains may be found on residential or commercial walls as graffiti, on wooden substrates, wood-composite substrates, concrete substrates, paper substrates (such as wall board coverings) and other such substrates that are normally painted with liquid coatings. The stains may reside either on the surface of the substrate itself, or near the surface of the substrate, or on the surface of a paint layer previously applied to the substrate, or well below the surface of the substrate. These stains may have components such as dyes, conjugated organic compounds, aromatic color bodies, and the like, and may be soluble in organic liquids, in water, or in both. Wood containing knots can be a source of stains also.

Water-based paints, including the so-called stain-blocking paints, readily redissolve water-soluble stains, and allow them to migrate to the surface so that they are still visible, often even after numerous applications. Water-soluble inks are particularly difficult to block with water-borne paint, because the ink dye is freely soluble in the water (continuous medium) of the paint. Even when dry, subsequently applied liquid coating layers again redissolve these water-soluble stains, leading to the stain being present and visible even after several water-based paint applications.

Similarly, solvent-based paints may redissolve lipophilic stains. The colored compounds or polymers of such stains may then be transported through the liquid film before the film has set to a dry state. Diffusion of these compounds through very thin films (often coatings are applied at about 25 to about 375 micrometers [about 1 to about 15 mils] thickness) typically occurs very rapidly, certainly within minutes, from the stain source to the top of the applied film. Stains or stain color bodies may thus travel through an applied liquid paint or primer due to its solubility in the continuous medium of the applied paint or primer (water and/or an organic solvent).

Wood containing knots can be especially troublesome. Coating such wood with a paint containing a solvent for the dark knot's color bodies can cause the colored chemicals to migrate to the newly formed paint surface. Thus, in a fashion similar to that of other lipophilic stains, knots in wood can cause the wooden substrate to be difficult to paint to hide the knot and its color bodies. It is then difficult to gain a uniform appearance, even with multiple coats of paint, since the color bodies from the knot will continue to be solubilized and transported to the freshly painted surface due to the solubility of the color bodies in the paint's continuous phase.

In order to limit the porosity associated with stain migration in a dried latex film, less porous latex primer films are commonly formulated by adding more coalescing solvent to the liquid paints, resulting in a better coalesced film, but one having a higher VOC content. Or if lower Tg or lower molecular weight polymers are used to obtain better films at ambient temperature with minimal amounts of solvent, the resulting films may be tacky and prone to dirt pickup. Thicker coatings which may slow stain transmission may have undesirable characteristics such as poor performance on vertical applications (poor sag resistance). Selecting a stain-blocking composition without regard to the effects that result from the drying of the composition would clearly be an advantage.

Typically, when a liquid stain blocking primer paint is applied to a substrate stained with a soluble colored material, the stain is solubilized and transmitted very rapidly through the drying paint film, often within seconds. Thus the primer paint is not blocking the stain, since it is transmitted rapidly through the wet coating. If the primer coating, when dry, does not hide the colored compound distributed throughout the coating, but nonetheless traps the stain within the coating beneath the coating surface, it can at best be considered a stain-trapping formulation, and not a stain-blocking formulation. In such cases, the color will still be visible on the dry primer surface. If the primer coating is an excellent stain trapper, it will inhibit the transport of the colored stain through subsequently applied liquid coatings, but often perhaps still leaving the stain visible. Nonetheless, some of the better stain trapping latex primer paints on the market today do not completely trap water-soluble stains.

It would clearly be an advantage to obtain a stain-blocking effect without the drawbacks associated with liquid paint or primer stain-blocking coatings. It would be especially advantageous were it possible to block stains regardless of the hydrophilic or lipophilic nature of the stain, and without the need to wait until the liquid paint or primer has dried before subsequently applying one or more additional liquid coating layers. Providing a relatively non-porous coating that is less susceptible to bleed-through when subsequent liquid coating layers are applied would be a further advantage.

BRIEF SUMMARY OF THE INVENTION

The claimed invention relates to methods of blocking stains on substrates to be painted with one or more liquid coating layers, and to stain-blocking compositions that are useful according to the claimed methods. In one embodiment, the inventive method includes the steps of contacting a stained portion of a substrate with a dry film layer; applying pressure to the dry film layer to cause the dry film layer to adhere to the stained portion of the substrate and to at least a portion of the substrate adjacent the stained portion of the substrate; and subsequently coating the substrate and the dry film layer with one or more additional liquid coating layers. The invention further relates to stain blocking compositions useful according to the claimed methods, that include a release layer; a dry film layer, that can be clear or pigmented; and optionally, an adhesive layer, that can be clear or pigmented, provided to assist in adhering the dry film layer to the stained portion of the substrate, and to that portion of the substrate immediately adjacent the stained portion of the substrate.

DETAILED DESCRIPTION OF THE INVENTION

Figure 1:
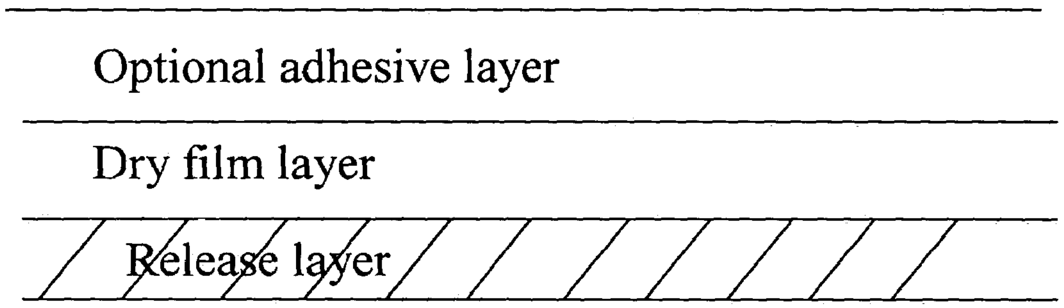
FIG. 1 depicts a side view of a dry film composite comprising a release layer, a dry film layer, and an optional adhesive layer.

In one embodiment, the invention relates to a method of blocking stains on a substrate to be painted, the method including the steps of contacting the stained portion of the substrate with a dry film layer; applying pressure to the dry film layer to cause the dry film layer to adhere to the stained portion of the substrate and to at least a portion of the substrate adjacent the stained portion of the substrate; and subsequently coating the substrate and the dry film layer with one or more liquid coating layers. The dry film layer may directly contact the stained portion of the substrate and a portion of the surrounding substrate, or may be adhered to the stained portion and a portion of the surrounding substrate by the use of an optional adhesive layer. If the dry film layer itself provides sufficient adhesion to the intended substrate, then a separate adhesive layer is not required.

In another embodiment, the invention relates to stain blocking compositions useful according to the claimed methods, that include a release layer; a dry film layer, that can be clear or pigmented; and an optional adhesive layer, that can be clear or pigmented, intended to assist in adhering the dry film layer to the stained portion of the substrate, and to at least a portion of the substrate adjacent the stained portion of the substrate.

By the term "substrate," we mean literally any surface that may be advantageously coated or painted with one or more liquid coating layers. Floors, walls, and ceilings are all suitable substrates for use according to the claimed methods, as are various movable objects. Examples of fixed substrates include decking and porches. Examples of movable objects include doors, door panels, flat stock, such as molding, furniture, cabinets, and their doors, and frames, window frames, and lumber intended for use in the above applications. In one aspect, the substrate is substantially vertical, for instance the wall of a dwelling, office, warehouse, other industrial facility, or the like. The substrate may be bare, such as a plastered wall, wallboard or particle board, or may be already coated with one or more coating layers, or even with wallpaper. It is important only that the substrate bear one or more stains, as defined herein, that are intended to be blocked prior to coating the substrate with one or more liquid coating layers, and that the substrate be suitable for coating with one or more liquid coating layers after the stain has been blocked with the dry film layer.

When the dry film layer directly contacts the stained portion of the substrate and the adjacent substrate, the dry film layer should exhibit sufficient adhesion so that the dry film layer remains in contact with the substrate until such time as the one or more liquid coating layers is applied. The dry film layer may be directly contacted with the stained portion of the substrate, or may optionally be adhered to the stained portion of the substrate and to the surrounding substrate by the use of an adhesive layer. Of course, if the dry film layer itself provides sufficient adhesion to the intended substrate, then a separate adhesive layer is not required. It is also important that the dry film layer remain adhered to the stained portion of the substrate and to the surrounding substrate for the intended lifetime of the final painted substrate.

By the term "blocked," we mean that the stain cannot be seen, or is substantially less visible, once one or more liquid coating layers are applied, or in those cases where the stain is not visible or only slightly so, that the stain is functionally blocked to prevent the stain from reducing the adhesion of one or more subsequently applied liquid coating layers. As explained below, the dry film layer itself need not be pigmented, but need only prevent the stain bleeding through the dry film layer once one or more liquid coating layers is subsequently applied. In certain embodiments, the optional adhesive layer is pigmented, since in certain embodiments the adhesive layer may be the thickest layer. In other embodiments, the dry film layer may be pigmented, or may be clear. In other embodiments the dry film layer may itself contain an adhesive resin, or may exhibit sufficient adhesion such that an adhesive layer is not required.

By "contacting" the stained portion of the substrate with a dry film layer, we mean either that the dry film layer is in direct contact with the stained portion of the substrate (the stain being on or within the substrate), or that the dry film layer indirectly contacts the stain by means of the optional adhesive layer. Pressure is applied, to the extent necessary, to cause the dry film layer to adhere to the stained portion of the substrate and to the surrounding substrate.

The term "stain" is intended to encompass literally any mark, blemish, discoloration, or any deposit, whether or not visible or readily apparent to the naked eye, that would affect the ability to satisfactorily cover the substrate with one or more liquid coating layers so that a stain cannot be seen, or so that the one or more liquid coating layers satisfactorily adheres to the stained portion of the substrate. The term "stain" thus includes, without limitation, marks caused by inks, crayons, lipstick, grease pencils, smoke residue, tannins, water, and the like. These stains may be found on residential or commercial walls as graffiti, markings from pens or color markers, on wooden substrates, on wood-composite substrates, on concrete substrates, paper substrates (such as wall board coverings), and other such substrates that are normally painted with one or more liquid coating layers.

These stains may reside either on the surface of the substrate itself, or on the surface of a paint layer previously applied to the substrate, or even within a paint layer previously applied to the substrate, or below it; that is, well below the surface of the substrate. These stains may have components such as dyes, conjugated organic compounds, aromatic color bodies, and the like, and may be soluble in organic liquids, in water, or in both. Knots in wood are thus considered stains also. Any unsightly blemish or material, different in color from the substrate on which it lies, which may be composed of or derived from ink, tannin, vegetable or mineral material, food substances, smoke residue (often yellow to brown or black), and the like, and especially those having color bodies that "bleed through" a paint topcoat when the paint is applied wet, are all intended to be encompassed within the definition of a stain suitable for blocking according to the claimed invention, as are deposits not visible to the naked eye, such as a variety of clear or unpigmented oily or lipophilic substances, that might cause a subsequently-applied liquid coating (especially an aqueous liquid coating) to fail to adhere to the substrate. These include, without limitation, mineral oil, petrolatum, clear or pigmented wax pencils or crayons, or any number of other lipophilic substances that are oily or greasy in nature, including various food residues. The term "stain" is also intended to encompass holes, blemishes, cracks, and other minor surface imperfections, such as nail holes, which might prevent a subsequently applied liquid coating layer from properly adhering to the stained portion of the substrate.

By the phrase "stained portion of the substrate," we mean that portion of the substrate on which or in which the stain resides, and on which the dry film layer is deposited so that the stain cannot be seen, or so that the stain does not bleed through any subsequently applied liquid coating layers, or so that the stain cannot affect the adhesion of subsequently applied liquid coating layers. In some cases, the dry film layer or optional adhesive layer will directly contact a stain residing on the surface of a substrate. In other cases, the dry film layer or optional adhesive layer will contact the surface of the substrate above the stain residing within the substrate. In still further cases, the stained portion of the substrate will include that portion of the substrate immediately adjacent to the stain, in order to effectively block migration of a stain which might otherwise migrate to or through one or more subsequently applied liquid coating layers from the edge of the applied dry film layer.

The dry film layer will incidentally adhere to at least a portion of the substrate adjacent the stained portion of the substrate, in order to ensure that the stain is covered so that the stain is effectively blocked. The size or shape of this adjacent portion is not critical, and for convenience may simply be that portion of the substrate which would be difficult to avoid covering based on the size and shape of the stained portion of the substrate. Because the dry film layer may be selected so as to avoid adversely affecting the appearance and function of the substrate as a surface to which one or more liquid coating layers is applied, covering this adjacent portion of the substrate with a dry film layer does not significantly affect substrate suitability for this purpose. It is therefore not critical how much of the adjacent portion of the substrate is contacted with the dry film layer. The dry film layer may be modified so that it covers only the stained portion of the substrate, or the dry film layer may be left in the size and shape originally provided, without being modified to fit the size and shape of the stained portion of the substrate.

The dry film layer may be comprised of a film of any of a number of types of polymers, such as acrylic, urethane, epoxy, hydrocarbon resin, vinyl, ethylene copolymers, styrene copolymers, and the like. The dry film layer may be applied by coating a liquid paint onto the release layer and drying, or by any other known method of applying polymer films, such as by applying a powder coating and fusing, by flame spraying, and the like. Drying may occur at ambient temperature or at an elevated temperature. The dry film may be comprised of crosslinked polymers or un-crosslinked polymers, or a mixture of both. The dry film layer useful according to the invention can thus be comprised of a variety of polymer films. These polymers may be cationic, anionic, or neutral. The dry film layer may be multilayer, each layer of the dry film containing a cationic, anionic, or neutral polymer. Thus, each layer of the dry film may have a positive or negative charge, or may be neutral. By dry film layer, we mean one that is preferably dry to the touch and exudes no liquid substance.

Types of polymers for use in the dry film layer include, without limitation, acrylic polymers and copolymers, olefin polymers and copolymers, vinyl ester polymers and copolymers, di-olefin polymers and copolymers, vinyl chloride polymers and copolymers, vinylidene chloride polymers and copolymers, styrene and substituted styrene polymers and copolymers, natural polymers such as rosins, hydrocarbon polymers, styrene resins, polyurethanes, polyureas, melamine resin cured hydroxyl functional resins, melamine resin cured carbamate resins, and the like. Generally, any polymer useful for architectural coatings purposes may be used.

For an interior wall coating, for example, liquid waterborne latexes are commonly used in paints as binders, which may contain a vinyl acetate polymer or copolymer. These polymers are generally suitable for interior coatings, but may not be sufficiently weatherable for outdoor exposure. A dry film layer for indoor use according to the invention may contain such a polymer. Likewise, a dry film coating for outdoor application may have as a binder a waterborne acrylic latex. A conventional stain blocking paint may contain a more hydrophobic polymer latex than a typical indoor paint as discussed above, for example one comprising styrene and 2-ethylhexyl acrylate. The dry film layer according to the invention may also be composed of cured alkyd paint or polyester paint, or a dry latex film, which may be hydrophobic in nature.

With the dry film layers according to the invention, significant advantages over their liquid counterparts are obtained. Not only are the many advantages of dry paint (little or no VOC or odor, etc.) obtained, but dry films may achieve properties not achievable by liquid coating techniques. For example, the paint film may be baked to fully dry or even crosslink the polymer for greater hardness or solvent resistance properties for the film. Any volatile emissions may be captured in an industrial setting and either burned to recover energy or recovered for recycle. Generally, with similar liquid paints, it would be very difficult to apply sufficient heat to dry or cure a wall painted with a liquid coating. Another advantage of forming the dry film in a factory setting is that the film may be formed in a horizontal orientation, so sagging is not a problem as it may be with liquid paints applied on vertical surfaces. In general, it is less costly and wasteful of paint to apply a liquid paint under controlled industrial conditions and with controlled film thickness by machine and skilled Workers than it is for the average homeowner to apply their own liquid paint.

Specific examples of suitable polymers for use in the dry film layer include copolymers of methyl methacrylate and butyl acrylate, copolymers of styrene and butyl acrylate, copolymers of ethyl acrylate and styrene, polybutadiene, copolymers of styrene and butadiene, copolymers of styrene and isoprene, copolymers of vinyl acetate and butylacrylate, copolymers of vinyl acetate and vinyl neodecanoate, terpolymers of vinyl chloride, vinylidene chloride and ethyl acrylate, terpolymers of vinyl acetate, ethylene, and butyl acrylate, copolymers of ethylene and vinyl acetate, polyisoprene, terpolymers of styrene, butyl acrylate, and acrylonitrile, solvent borne or waterborne polyurethane, solvent borne or waterborne aliphatic or aromatic polyesters, acid or amine cured epoxy resins, aminoplast cured polyesters, and the like. Others are hydrocarbon resins such as those based on cyclopentadiene, indene, cumarone-indene, and the like; as well as polyvinyl butyral. Many types of polymers that are suitable dry film formers are known in the art, and may be prepared in a variety of processes such as free radical polymerization, cationic polymerization, anionic polymerization, group transfer polymerization, atom transfer polymerization, etc., sufficient to achieve the molecular weights discussed elsewhere. Polymers may be amorphous, crystalline, semi-crystalline, or mixtures thereof.

Polymers that are suitable generally contain additional features, for purposes other than stain blocking. For example, polymers may contain acid functionality, which generally promotes adhesion to substrates. The acid functionality may be chosen from acid-containing moieties such as carboxylic, phosphonic, sulfonate, sulfate, and the like. Other types of functionalities that are suitable are wet-adhesion promoters such as those materials containing a cyclic urea functionality, an amine functionality, a quaternary ammonium functionality, and the like. Suitable acid-containing monomers that may be incorporated are methacrylic acid, acrylic acid, itaconic acid, maleic acid, phosphate-containing monomers such as phosphonatoethyl methacrylate, vinyl phosphate, phosphonatobutyl acrylate, vinyl phosphonic acid, sulfate containing monomers such as sulfoethyl methacrylate, acrylomidomethyl propyl sulfonic acid, sodium vinyl sulfonate, sodium styrene sulfonate, and the like. Suitable cyclic urea-containing monomers are methacrylatoethyl ethylene urea, methacrylamidoethyl ethylene urea, N-allyl ethylene urea, and the like. Suitable amine monomers are methacrylatoethyl dimethyl amine, methacrylatoethyl-t-butyl amine, N,N dimethylaminopropyl methacrylamide and the like. Suitable quaternary ammonium monomers are diallyidimethyl ammonium chloride, methacrylamidopropyl trimethylammonium sulfate, methacrlatoethyl trimethylammonium chloride, and the like.

Polymers that function less well at blocking stains, especially in conventional liquid coating compositions, are those that are soluble in or permeable to solvents in which the stains are soluble. For example, water-soluble ink will generally pass through a liquid coating that is permeable to water. Thus, water soluble inks will generally penetrate hydrophilic polymers such as polyvinyl alcohol, hydrolyzed polyvinly acetate, and the like. However, oil soluble stains, inks, and the like will be blocked by these same hydrophilic polymers, so they too are useful as dry film components.

Waterborne paints such as latexes are suitable to form the dry film layer if a sufficiently good film is formed that is composed of tightly knit polymer molecules (typically described in the paint industry as being “well-coalesced”). To block water-soluble ink, for example, a paint used to form the dry film layer should be not only well knit, but also sufficiently water-insoluble or non-swellable with water, such that water will not rapidly permeate the film. Thus, polymers of uncrosslinked polyacrylic acid having a molecular weight (Mw) of about 5,000 would likely have relatively poor ink blocking properties. In contrast, a hydrophobic polymer composed of ethyl hexyl acrylate having a molecular weight of about 200,000 would be predicted to have relatively good ink blocking properties. In general, it is believed that more hydrophobic polymers having a higher molecular weight will exhibit improved water-soluble ink blocking properties. One skilled in the art of coating formulations will be able to select polymer compositions suitable for use in the dry film layer to block most types of stains.

Generally, compositions that are used in the industry are prepared from more than one monomer, and thus are co-polymers or ter-polymers, or may be composed of essentially any number of different monomers which will form polymers of suitable molecular weight. Such molecular weights in the cured or dry film are generally greater than about 1000 molecular weight, preferably greater than about 5,000 molecular weight, and even more preferably greater than 10,000 molecular weight. However, during preparation of such dry films, polymers of lower molecular weight may be used.

Some form of curing or crosslinking may be added in order to achieve a film with sufficient properties so that the dry film layer functions as desired. The cured molecular weights will generally be at least those mentioned above. Maximum molecular weights are generally those achievable by conventional polymerization techniques known to polymer chemists in the art of coating compositions. Latex polymers may achieve molecular weights of 100,000 or more. Crosslinking, of course, can produce polymers which are sufficiently crosslinked to be considered to have an infinite molecular weight—meaning there is little or no extractable polymer material in the final dry film.

Polymers useful to form the dry film of this inventions may have glass transition temperatures (Tg’s) within a wide range, and generally from about −60° C. to about +90° C., as measured by either thermal or mechanical methods. For acrylic polymers, Tg’s typical of latex paints are suitable, from about −50 to about +80 may be used, or from about −45° to about +60° C. Low molecular weight polymers such as tackifiers may be used.

If latex polymers are used to form the dry film, latex polymer morphology control is generally not needed for dry film layers, thus allowing generally simpler manufacturing processes than for many liquid paints. Special properties may be achieved by using latex morphologies such as core-shell, gradient compositions, and hemisphere-type morphologies, so these should not be excluded from use in dry film layers.

Thus, whereas water-soluble stains may best be blocked using dry film layers containing hydrophobic polymeric binders, oil-soluble stains may be best treated by dry film layers containing hydrophilic polymeric binders. More polar hydrophilic polymers will resist the transport of oil-soluble stains (generally relatively non-polar). To resist both oil- and water-soluble stains, the dry film layer may contain both hydrophilic and hydrophobic polymers. These may be provided as discrete layers, as blends, or as microscopically separated phases in the dry film layer. Separate layers may be advantageous if two or more types of polymers are present.

Thus, even some water soluble polymers may be useful as dry films in blocking stains. For example, poly(vinyl alcohols) with varying degrees of hydrolysis and molecular weights may be useful as illustrated in the examples. However, it is generally preferred for water-soluble stain blocking applications that the polymer in the dry film layer be of limited solubility in water. If polymers are water soluble, then their molecular weights should be sufficiently high that, as their films are wet with water (or water-based paint topcoat), a viscous gel would be formed at the water-soluble polymer interface Which would inhibit the transport of water and therefore water-soluble stains. However, for oil soluble stains, such water soluble polymers may be highly suitable. Generally, if water-soluble dry films are used for water-soluble stain blocking purposes, a guideline for successful application is that they should be greater than about 5000 in molecular weight. Since such polymers vary considerably in properties, it is difficult to set absolute boundary conditions on their utility without considering each separately. In general, higher molecular weight is preferred, to include crosslinked films of water soluble polymers.

As a further general guideline in selecting a polymer for use in a dry film to block a stain, the liquid medium in which the stain is soluble should not re-solubilize the dry film polymer. Most dry films will work to block stains so long as a solvent is not present which will both dissolve or swell the stain and the dry film. Thus, the dry film should protect and isolate the stain from a solvent which may dissolve the stain, and the dry film must therefore resist the solvent. The solvent may come from the subsequently applied topcoat, or from any other source (water is a commonly available solvent in households or in the environment). Other solvents commonly available either in paints or in household chemicals include the following: aqueous ammonia, acetone, methyl ethyl ketone, hydroxyethyl ethers, hydroxypropyl ethers, alcohol alkoxylates, mineral spirits, lower alcohols, xylene, esters, and the like.

Although pigments may help in the stain blocking process—for example, platy pigments may hinder the path through which stain color bodies must migrate to reach the topcoat, or they may absorb color bodies on their surfaces, they are not strictly necessary for the dry film layer. The chief reason for the presence of pigments is for hiding, to provide color to help hide the underlying stain. If, for example, a subsequently applied topcoat is sufficient in hiding power, then no additional pigment is needed in the dry film layer. In addition, pigments may also absorb certain dyes and color bodies through their surface affinity for the dye, or through their porosity or high surface area; and so may help the dry film layer in its function. Another reason for a dyed or pigmented dry film layer is so that the person applying the dry film layer can readily see where it has been applied. A clear film may not be sufficiently visible for some applications. However, some specific embodiments may include a clear dry film layer. For example, to cover nail holes, a clear film may be preferable to a colored film. However, a colored film may also be preferable, for example, if a color is selected to match the color of the substrate on which the hole is present.

Suitable pigments for hiding include titanium dioxide, zinc oxide, and in general, any low-color, relatively insoluble metal oxide. Hollow particles, organic opaque materials, or other pigment substitutes may also be used. Carbon black, activated carbon, or other carbon forms may be used. These are typically black, and may contribute significantly to hiding.

In a further embodiment, colored pigments and dyes may also be used to formulate the dry film layer. Depending on the color of the wall or other substrate, the dry film may be formulated to match the substrate color; however, this is not always necessary. To be broadly applicable, however, it is generally more practical to formulate a lighter color or white dry film layer if the layer is to be subsequently coated by one or more colored liquid topcoats, since a dark dry film layer will more readily show through a light color topcoat. Thus the hiding ability of the stain blocking dry film may be increased by adding light colored or white pigments, although darker pigments may be added to add to the hiding performance, or for coloration purposes. Dyes are also suitable colorants for dry films, provided they are not leached out and do not fade during their expected lifetime.

The amount of pigment incorporated is not especially critical, unless so much pigment is used that good film formation is prevented (that is, generally above the critical pigment volume concentration, CPVC). For example, with too much pigment, the dry film layer may be too porous, thus allowing water or solvent to readily permeate and carry through the dry film layer the soluble color bodies. The types of pigments generally suitable are those of small particle size, generally from about 200 nanometers in diameter to about 2 micrometers in diameter or more. Generally, the pigment diameter should be less than the dry film thickness. More specifically, the pigments may be titanium dioxide, zinc oxide, calcium carbonate, silica, silica-alumina, alumina, hollow particles, magnesium silicate, clay, talc, mica, and the like. Essentially any pigment commonly used in commercial paints may be suitable. Titanium dioxide may be referred as the main pigment component, and it may be used as the only pigment component if pigment is desirable.

It is not, however, necessary for the dry film layer to have any color or pigment. It may instead be clear, which allows the stain to be seen through the dry film. However, upon coating with one or more liquid coating layers, the stain should not bleed through the dry film layer into the liquid coating layer. The liquid coating layer is then relied upon to hide the stain. It is nonetheless useful to include a pigment in the dry film layer to enhance hiding of the stain, and also so that the applicator may readily observe where the dry film has been placed.

The color of the dry film layer, if present, may be essentially any type, so that the applicator may see where the film is applied. The dry film may be of high gloss, which also helps to determine where the film was applied, and may also be of a flat, low-gloss type of finish if a less visible stain-blocking effect is desired.

A number of ingredients are useful in preparing a resin and a pigment for use together in a paint. These are generally known as additives, surfactants, grind resins, defoamers, solvents, thickeners, biocides, and the like. These additives are numerous in the coatings industry and known to those skilled in the art of formulating paints. Several of these are given in the examples to follow. The desired additives for a particular coating are readily selected by those skilled in the art of paint formulations.

For coating release layers with liquid coatings to obtain a dry film layer, it is often advantageous to include a thickener or surface active agent to enhance the flow properties of the liquid coating. Many times, if a liquid coating is sprayed onto a release layer having very low surface tension, the coating while still in the liquid state will "crawl" or bead on the surface rather than form the desired thin film. Increasing the viscosity of the liquid coating minimizes this effect. Many thickeners are useful for this purpose. For waterborne coatings, especially useful are a class of thickeners called associative thickeners. Surface active agents such as surfactants, surface active polymers, silicone surfactants, fluorocarbon surfactants, flow aids, and the like are often also useful. Many companies specialize in selling thickeners and surface active agents and may recommend types useful in preventing an undesirable flow of coatings on release layers.

Examples of thickeners which may be suitable for enhancing flow properties of waterborne coatings are the HEUR and HASE associative thickeners available from Rohm and Haas, Sud-Chemie, Clariant, Union Carbide and others; cellulosics thickeners available from Hercules, Union Carbide; specialty waterbased thickeners like polysulfonic acids available from Henkel, and the like. Examples of surface active agents are nonionic, anionic, and cationic. Conventional surfactants may be of use and vary in structure widely. Silicone and fluorocarbon surfactants may be more useful in that less surfactant is effective relative to conventional surfactants. Surfactants in these latter categories are available from du Pont, Union Carbide, Huls America, Cognis, and others. Useful special nonionic surfactants are acetylenic alcohol based nonionic surfactants available from Air Products. Useful polymeric flow control agents are available from BYK-Chemie USA. Since the materials listed above are of such variety and since they may act differently with each aqueous polymer to be thickened, some routine experimentation may be helpful to achieve a desired rheology. In one aspect, the dry film layer is itself pressure-sensitive, that is, it will adhere to common substrates (walls, painted walls, wood, concrete, and the like) when pressure is applied, or even when the dry film layer is simply brought into contact with the substrate. The nature of a pressure sensitive dry film layer may be tacky to the touch at room temperature. Generally, at temperatures above room temperature, the dry film will increase in tackiness. Low molecular weight resins and polymers known as tackifiers may be added to the dry film or optional adhesive layer to enhance the tackiness of the layer.

In another aspect, the dry film layer is substantially solvent-free, that is, it exudes no liquid substance, and contains less than about 10% by weight of solvents as a percentage of the film solids. These solvents may be water, Texanol® ester alcohol, ketones, alcohols, esters, ether alcohols, aromatic compounds like xylene, mesitylene, diethyl benzene, and the like, which may impart VOC or odor to a coating. These solvents may be present to promote flow, adhesion to a substrate, or for other purposes. Preferably, less than 5% of the coating film composition will be comprised of solvent. Differentiated is water of hydration, which is the equilibrium level of water absorbed into or onto the surface of a coating in contact with its surrounding environment. When we discuss water content of the film, we mean that amount of water that is in excess of the coating's environment equilibrium level.

The pressure applied to the dry film layer to cause the dry film layer to adhere to the stained portion of the substrate, and to at least a portion of the substrate adjacent the stain, can be provided by a variety of means, including, but not limited to, a roller around which the stain-blocking composition may be wound, or a spatula or other stiff straightedge, which may nonetheless be relatively flexible. Thus, a simple roll may be used, such as those used with a roller to apply liquid coatings. When the dry film layer is so applied, it may be smoothed on using a stiff flexible blade applicator, such as a metal or plastic spatula. The pressure may also be applied by hand, directly or through use of a suitable cloth or other device to ensure that the pressure applied is relatively uniform across the surface to which the pressure is applied. Because the dry film layer is provided on a release layer, the pressure applied to cause the dry film layer to adhere to the stained portion of the substrate and to the surrounding substrate will generally be applied to the side of the release layer opposite the dry film layer.

By the phrase "coating the substrate and the dry film layer with one or more liquid coating layers," we mean that after the dry film layer is applied, the dry film layer and the surrounding substrate are coated with at least one liquid coating layer by any conventional means. The entire substrate may be coated, or a substantial portion of it, or if the liquid coating layer when dried is substantially the same color and texture as the existing substrate coating, then only that portion of the substrate adjacent the stained portion of the substrate need be coated.

Thus, the stained portion of the substrate and the surrounding substrate of the claimed method are both coated with a liquid coating layer, without regard to precisely what part of the substrate the dry film layer has been applied. The dry film layer itself is unobtrusive, and may be relatively thin or feathered at the edges, so that when a subsequently applied liquid coating has dried, there is no hint whatever that a stain existed, or even that the dry film layer itself was applied prior to the liquid coating. Thus, while methods of covering errant typewritten characters leave a dry film layer that can be seen with the naked eye, due to differences in color and texture, the method according to the present invention preferably leaves no trace whatever of the stain or of the dry film layer.

Suitable adhesive substances for use in the optional adhesive layer include those useful in the industry for tape and tape products, those used for correction tape, and generally any substance used to cause one substrate to adhere to another. These may thus be of any type, so that the dry film layer adheres to the substrate. Suitable adhesive substances include, but are not limited to those substances known in the pressure-sensitive adhesive art. Some examples are acrylic polymers, hydrocarbon polymers, styrene-isoprene polymers, isobutylene polymers, urethane polymers, natural rubber, and the like. The polymers may be of random or block construction. They may be organic soluble substances, or may be water-dispersible (for example, latex). Suitable tackifiers for the dry film layer or the optional adhesive layer include, but are not limited to rosin, rosin derivatives, hydrocarbon resins such as those made from C5 to C9 olefin and cyclic diene monomers. Processing oils such as paraffinic oil, naphthenic oil, and aromatic oil may also be used. Other additives may be present such as antioxidants, biocides, and the like. The resins and tackifiers may be organic soluble, water dispersible, or even to some extent water soluble.

The adhesive layer may be applied to the dry film layer already provided on the release layer. The adhesive of the adhesive layer may be chosen from those typically used in the adhesives industry, such as a waterborne latex with a Tg from about −60° C. to 0° C., as a solvent-borne resin, as a powder, or even as a 100% solids resin. The adhesive may be applied by conventional techniques used to coat films, such as by printing, spraying, electrostatically spraying, doctor blade, roll coater, reverse roll coater, and the like. Printing may be accomplished by a variety of techniques including gravure, slot printing, silk screening, flexographic, ink jet, wide format ink jet, or other methods used in printing.

The thickness of the adhesive layer may typically be from about 2 micrometers to about 500 micrometers, or at least about 2 micrometers, or 10 micrometers or more, or 20 micrometers or more. The minimum thickness is that which can be applied to cover the dry film layer surface so that adequate adhesion to the substrate can be realized. If the thickness of the adhesive portion is a substantial fraction of the entire dry film thickness to be transferred, then if hiding is desired, it is advantageous that the adhesive phase be pigmented. Since the pigment present in the film must be contained in the film thickness, if it is contained only in the dry film layer, insufficient hiding may result. Thus in one embodiment, pigment is incorporated into the adhesive layer, in addition to or in place of any pigment present in the dry film layer.

Thus, in order to gain additional hiding by the dry film layer, the adhesive layer may be pigmented. It may have the same additives as discussed for the paint binders above. The composition of the adhesive layer may comprise the same polymers found in the paint binder. In addition, they may also be resins typically found in industrial or architectural adhesives, and may include tackifiers.

In another aspect, the invention relates to stain blocking composites useful according to the claimed methods, that include a release layer; a dry film layer, that can be clear or pigmented; and optionally, an adhesive layer, that can be clear or pigmented, that is intended to assist in adhering the dry film layer to the stained portion of the substrate and to at least a portion of the substrate adjacent the stained portion of the substrate.

The release layer according to the invention is preferably a thin flexible film of paper, plastic, or the like, having a relatively low surface tension. This release layer may include a thin coating of a release substance, such as a silicone polymer, fluoropolymer, hydrocarbon polymer, or the like. The release layer of the claimed compositions can thus be paper, wax-treated paper, glassine paper, polyethylene, polypropylene, polyethylene terephthalate, nylon, or the like. These materials are generally selected based on their strength, and on their ability to hold the dry film layer in place, and release the layer when desired. The release layer may have a degree of crystallinity which is known by those skilled in the art to increase the strength and heat deformation temperature of the polymer film.

In one aspect, the claimed method can be performed with a device such as those used in correction devices to cover a mark made of ink, such as from a typewriter, a pen, or a pencil. Such devices have been found suitable to block small stains on a substrate to be subsequently painted with one or more liquid coating layers, though their narrow width and lack of feathered edges make them less suitable for some purposes than various other embodiments of the invention.

Thus, in certain embodiments, the dry film layer may be at least 0.5 centimeters in width (or diameter), or at least 1 or 2 centimeters in width, or at least 5 centimeters in width, or 10 centimeters in width, or greater. The term width is intended to include diameter, if, for example, the dry film layer is round or oval, square, or an irregular shape.

In another embodiment, the dry film layer is provided with one or more feathered edges. In certain embodiments, all of the edges, or, in the case of a circular dry film layer or one that is rounded or oval, the entire edge of the dry film layer, is feathered. Feathered edges provide the ability to overlap adjacent dry film layers, and to avoid a detectable edge which might remain even after one or more additional liquid coating layers is applied.

The claimed invention thus relates, in one embodiment, to a wide band of dry film, generally greater than 0.5 centimeters in width, that may have feathered edges, which is suitable to completely cover stains of areas wider than about 0.5 centimeters. In general, the feathered edges of the coating serve to minimize the visibility of the surface-applied dry film layer. If the dry film is thin enough so that the edge is largely invisible on the substrate and does not cast a shadow if the light source is from a direction near normal to the edge, then no edge feathering may be needed. Films of thickness of less than about 0.5 mil (12 micrometers) generally need not be feathered on the edges, but from about 0.5 mil (12 micrometers) or greater thickness, it is desirable for many applications to have the edges of the dry film layer thinner than the center of the film.

The desired dry film thickness may depend on the application and the application conditions. A thickness of about 0.1 mil (2.5 micrometers) is sufficient to block many stains. However, it is difficult to incorporate enough pigment to achieve excellent hiding. Films of this thickness are often not strong enough to survive application conditions, or may be easily damaged upon mild abrasion or subsequent coating application methods such as brushing or rolling. Films of thickness of about 1 mil (25 micrometers) are generally sufficiently strong to survive application conditions and may contain sufficient pigment for good hiding. The film thickness may thus be from about 10 micrometers (0.4 mil) to about 150 micrometers (6 mils), or from about 20 to about 100 micrometers. The minimum film thickness may be limited by the ability to block the stain, and by its opacity if it is to also hide the stain. Thinner films may require more opaque pigment to hide than do thicker films, but if too much pigment is used, stain blocking may suffer as a result, since insufficient polymer may be available to block solvents from permeating the dry film. Even thicker coatings may be used to achieve certain goals such as excellent hiding. Limiting factors on thickness may include cost, flexibility, and weight of the coating (contained on an applicator roll, for example). Nonetheless, coatings of 6 or even 20 mils or more (150-500 micrometers) may be used.

The dry film layer thus may be pressed directly onto the stained portion of the substrate in order to cover the stain. Once applied, the dry film adhering over the stained portion of the substrate blocks the transmission of the stain to any subsequently applied liquid coating. If the dry film layer applied over the stain is sufficiently pigmented, it may completely hide the stain. If the dry film is clear or colorless, it will nonetheless block the stain from migrating to a subsequently applied liquid coating, and will prevent the stain from affecting the adhesion of subsequently applied liquid coating layers.

In one embodiment, the dry film layer comprises a dry latex film, thus fully addressing many of the shortcomings of liquid stain-blocking compositions. There is no odor or other safety concerns. There is no clean-up required. Stains are not re-dissolved, because the film is applied dry, and may act as a barrier when one or more liquid coating layers is applied. There is no stain migration. Indeed, after the dry film layer is applied, there is no waiting required before paint or other liquid coating can be applied, as is the case with oil- and water-based products. The dry film can also be used to cover small nail holes without the use of putty. There is no waiting to repaint as there is with spackling or putty.

The substrate is preferably substantially flat or generally planar. The average surface roughness of the substrate may range from about 1 micrometer to about 1 millimeter, as is typical of architectural substrates. Generally, applying wet paint by rolling, brushing or spraying can leave such a surface roughness. There may be gradual curvature in normal architectural construction (“not square” is a term used to describe normal building imperfections). Also, circular rooms (in houses, for example) have curved walls, but these would still be considered substantially flat since the curve is gradual, generally not less than about a radius of curvature of about 1 meter. Automotive parts (fenders, bumpers, etc.) often have surfaces with greater curvature (lower radius of curvature) and are a less preferred substrate according to the invention.

The substrate may be an architectural substrate, by which we mean a substantially flat substrate generally composed of cementitious material, wooden material, paper-covered material (wallboard/sheetrock), wooden composite material, or the like, used in the construction of dwellings, commercial buildings, and the like. The substrate may contain a previously painted or otherwise primed or prepared surface.

The advantages of the claimed invention are many. First, no cleanup typical of paints is required, resulting in significant savings in time and materials. Also, substantially no VOC (volatile organic compounds) need be liberated into the environment. More important for stain blocking, however, in comparison with a liquid coating, is that there is little or substantially no solvent in the dry film to transport the stain from the substrate to the top surface of the applied coating. The dry film is designed so that it is relatively impermeable to stain-carrying solvents. Also, this substantially dry film typically is substantially odor free. In addition, one may apply a paint topcoat immediately after applying the dry film, which may result in a significant time and cost savings.

The dry film layer useful according to the invention may thus be considered a true stain-blocking agent, because the dry film layer applied is already a continuous and relatively solvent-impermeable film. The dry film layer may be so constructed of polymers such that insufficient solvent (from a subsequently applied topcoat, for example) will dissolve in the film to transport through the film any significant amount of the colored stain. Thus the dry film layer truly blocks the stain, rather than simply trapping the stain within the film layer.

As already mentioned, manufacturers of correction tape have addressed covering and hiding ink errors on paper with a dry paint film. Devices that apply the dry paint film are generally available in office supply stores for the use of correcting errors in documents; that is, on a paper substrate. These compositions are generally described as correction tapes and may consist of two layers or more residing on a support film of plastic or paper. See, for example, U.S. Pat. Nos. 6,235,364 B1, 6,331,352 B1, and 6,352,770 B1. Devices to apply such films are also known. See, for example, U.S. Pat. Nos. 5,714,035, 5,393,368, Des. 355,934, 5,310,437, and 4,676,861.

Such devices can be used to cover stains on walls, as shown in some of the examples of the present application, and the use of such devices is encompassed within the claimed invention, when the dry paint film and the surrounding substrate are subsequently painted with one or more liquid coating layers. Of course, correction tape devices generally supply a paint film width of about 1 centimeter or less, and typically about 0.5 centimeters or less. A large stain (larger than about one line of type) cannot be easily covered with such an instrument, since many applications of correction tape would be needed to cover the stain, and in addition, the edges of the applied paint film may be of sufficient height (these devices generally supply paint films to paper of about 25 micrometers in thickness) to show through any subsequently applied topcoat paint, generally resulting in a non-uniform appearance. So while one may in practice carefully and tediously cover a stain with one of these devices, the end result would be less satisfactory unless a very tedious and artistic process were used.

Many methods are suitable for the preparation of the dry film layer on the release layer (the release support substrate) to render it ready for application to a stain-containing substrate. These include roll coating, reverse roll coating, spraying, electrostatic spraying, doctor blade, squeegee, printing, and the like. All of these techniques are common techniques used to apply paint or ink, and may be used to apply the dry film layer to the release layer. The dry film layer may be formed from a liquid coating, applied as a solid such as a powder, or even applied as a paste.

The preferred release layer materials are relatively thin, to allow support of the dry film layer, yet thick enough and strong enough so as not to allow the dry film layer to be damaged during handling and application. Suitable release layer materials may range from paper to plastic films such as polyester, polycarbonate, polyolefin, polyurethane, polyurea, polystyrene, polyacrylic, polyvinyl chloride, and the like. More preferred are materials containing a release coating, which may comprise siloxane, fluorocarbon, polyolefin, and the like. Especially suitable are strong plastic materials such as oriented polyethylene terephthalate, polycarbonate, or other oriented polymers such as polypropylene and the like. These support films have the additional advantage of heat stability (high heat deformation temperatures relative to many other plastics) and allow higher cure or drying temperatures to speed manufacturing.

Another characteristic that the dry film layer should have is the ability to adhere to the substrate on which it is applied. For this purpose, an optional adhesive layer may be used, as discussed herein.

In addition, subsequently applied liquid coating layers should adhere to the applied dry film layer. Thus, polymers which do not provide suitable binding surfaces might be less suitable, for example a low surface tension polymer such as poly(tetrafluoroethylene) used alone as the dry film. However, a properly formulated dry film layer may have many components, some of which may help the adhesion of subsequently applied liquid coating layers. For example, certain pigments can impart a surface suitable for good paint adhesion, or certain polar monomers present in the binder polymer of the dry film layer such as carboxylic acid-containing monomers, cyclic urea containing monomers, and the like may be useful. Those pigments having polar surfaces, which may reside on or near the exposed surface of an applied dry film layer, may be sufficient to overcome the influence of a relatively non-polar polymeric binder.

In another aspect, the invention relates to sheets or to rolls on which the dry film layer is provided. Indeed, the dry film composite (which includes a release layer, a dry film layer, and optionally an adhesive layer) may be useful in several configurations. For example, a roller device similar to those already described that are useful for the application of correction tape may be useful for the application of the dry film from the dry film composite, provided the width of the strip of dry film applied is of a useful width for its intended purpose. For example, to cover nail holes or cracks, a width of about 2 cm may be useful. To cover stains on walls, a width of 2 cm or greater is useful, or greater than 5 cm, or even 10 cm or more. For certain applications, a width of about 20 cm or more may be useful, or 25 cm or more, or even 30 cm or more. Smaller widths may be useful for spot treatment, whereas large stains can be more conveniently covered using a greater width of dry film. One or more edges of the dry film may be feathered or tapered. The angle of tapered edge (angle at the film edge between a tangent to the tapered edge curvature and the plane of the application surface) may be less than about 45 degrees, or less than about 40 degrees, or about 30 degrees or less.

An alternative method of spot treatment useful, for example, in stain blocking applications, is a sheet method. Thus a sheet of film acting as the release layer, having dimensions appropriate to the size of a stain on a wall, may be used. The dry film composite may be formed by printing or spraying, for example, liquid paint on the square sheet release layer of a size of about 8 cm on an edge, and then drying. The edges of the release layer may contain little or no dry film, and the center of the sheet may be the thickest portion of the dry film, with subsequently thinner dry film as it progresses toward the edge of the release layer. The concept is thus the same as a tape having one or more sides being feathered. The painted part of the release layer may thus be, for example, only about 36 $cm^2$. Thus the edges of the dry film may be feathered and extend to near the release layer edge: To cover the stain on the wall, the dry film layer with the optional adhesive layer may then be pressed onto the wall covering the stain, with the use, for example, of a spatula or other straightedge, which may be more or less flexible, or with a cloth, or even with a bare hand. For a larger stain, the sheet of release layer may be 20 cm on each side, or greater, and the area of the dry film layer may be about 350 cm or more.

Neither the sheet of release layer nor the applied dry film layer need be square. The release layer and the dry film layer provided thereon may be circular, oblong, square, or virtually any other shape. The applied dry film layer should, of course, cover the stain or a part of the stain.

One may wish to treat a large stained area (such as that resulting from fire or smoke damage), or may wish only to treat a localized stained area on a wall (such as crayon or ink markings) as described above. For the large area, rolls of release layer containing a dry film layer, for example with feathered edges, may be useful. For example, a roll of release layer of a width of about 20 cm, or 25 cm or greater, or even 30 cm or greater, is desirable. The dry film would then coat most of the surface of the release layer such that only the very edge of the release layer contains little or no dry film. As in other embodiments, feathered edges are advantageous for the dry film thickness. The length of the dry film composite roll could be from about 150 cm to as long as is manageable by a person applying the dry film.

Note that for rolls of the dry film composite, the release layer may contain a release-promoting polymer on the side opposite the dry paint layer. This back of the release layer will come into contact with the dry film or with the optional adhesive layer when rolled. So to promote ready unrolling, the back may be treated with a release polymer. The release polymer may be the same as or different than that residing on the other side of the release layer. These release polymers may be hydrocarbon, silicone, or fluoropolymer, and the like.

Generally, polymers useful in the dry film layer may be described by their glass transition temperatures. These temperatures are measured by either thermal or mechanical methods readily known to those skilled in the art. A range for latex polymers suitable for this application is from about −50° C. to about +80° C., or from about −40° C. to about +60° C., or from about −20° C. to about +40° C. A suitable Tg for other types of polymers will depend on the polymer type and its characteristics, such as tackiness.

The polymers used in the dry film layer may be crosslinked or uncrosslinked. Generally, a polymer that is not crosslinked will be nonetheless insoluble in solvents that may contact the stain blocking film. Typically-produced latex polymers are useful, even if they contain no gel fraction (uncrosslinked), if they have a relatively high molecular weight so that they are insoluble in water or other solvents that may contact the final film after it is applied to a stained substrate.

Too great a degree of crosslinking may compromise the stain blocking ability, if, for example, the film is applied over a substrate such as wood that can expand and contract depending on humidity or water exposure. If the coating cannot expand with the substrate it may crack, thus loosing its stain blocking ability. Thus, a film's elongation must match the degree that it may be elongated by substrate expansion.

In general, the dry film layer may be more hydrophobic if water resistance is required. Conversely, if organic solvent resistance is required, the dry film may be of such a composition that it is largely insoluble in the organic solvent. If resistance to both organic solvent and water is desired, then a very high molecular weight polymer may be used, or some degree of crosslinking may be provided, or the polymer may be made from components that impart insolubility in both types of solvents.

Thus the method may be carried out with sheets of defined size and shape, as well as with continuous rolls of various widths. The dry film layer is applied to the substrate with pressure, either by rubbing with the hand, rag, or roller as in the case of sheets, or with a device designed to apply pressure to press the film to the desired surface from a roll as the roll is drawn by hand across the surface (a similar, but smaller device is the correction tape dispensers already discussed).

The width of a dry film layer to be applied may range from about 0.5 cm to about 50 cm (about 20 inches) or more, or from about 3 cm to about 40 cm. The width of the dry film layer applied may be widely varied based on the ability of the applicator to efficiently handle the application of the dry film to the desired substrate.

Formulated paints that may be applied to the release layer and dried to form the dry film layer may contain any number of additives that assist in the paint application or drying process, or that may enhance appearance of the transferred dry film layer. These may include pigments, flatting additives, thickeners, solvents, surfactants, defoamers, biocides, flow control agents, and the like.

A paint composition from which the dry film layer may be prepared may consist of resin, optionally colorant or pigment, and various additives, which either aid in its application to the release layer, or assist in the stain blocking effect in the dry film layer. There may be surfactants such as acetylenic surfactants (known as Surfynols® available from Air Products and Chemicals, Inc.), anionic surfactants (such as alcohol ethoxylate sulfates or phosphates), non-ionic surfactants (such as alcohol ethoxylates), fluorocarbon surfactants such as those sold under the trade name of Zonyl (available from the DuPont Company), silicone surfactants, and the like. Other additives that may be useful are flow control additives, thickening agents, leveling agents, filler pigments, crosslinking agents, and the like.

The dry film layer additives are chosen so that they do not detract from the resulting stain blocking properties. For example, if a large amount of a water-sensitive polymer or pigment were added, the final dry film layer containing the water sensitive material may form hydrophilic channels permeating the final film, reducing the water-soluble stain blocking capability. The optimum additives, in practice, may be found through routine experimentation.

Suitable methods of application of the dry film layer are those which result in an applied continuous film, that is, a film which in general has few breaks, pin-holes, or defects through which may pass solvent from the subsequently applied liquid coating layers. The dry film layer defects to be avoided may be microscopic, or may be visible to the eye. Suitable methods of application result in pressing the dry film layer to the surface to be painted, so that one surface adheres to the stained substrate. The dry film layer thus placed should adhere and not be readily removed by subsequent operations such as painting over the dry film layer with one or more liquid coating layers. Application of the one or more liquid coating layers may, for example, be by brushing, rolling, spraying, or by any other suitable technique.

One method of applying the dry film layer is to rub or press from the release layer, thus, pressing the adhesive layer (if present) or the dry film layer (if an adhesive layer is not present) to the stained substrate by applying pressure to the back of the release layer, causing the dry film layer to be transferred to the stained substrate.

Suitable application devices include those that allow a dry film layer to be pressed to the substrate while being unrolled. For example, a roller device may dispense the film such that the backside of a release layer is pressed to cause the dry film to be transferred to a stained portion of a substrate, so that the dry film layer adheres to the stained substrate, and the release layer is taken up and rewound by the mechanism within the roller device. Such roller devices include those described in U.S. Pat. Nos. 5,310,437, 4,676,861, 5,393,368, 5,714,035, the disclosures of which are incorporated herein by reference, except that the device to cover stains may apply a significantly wider film than is contemplated in the cited references. The suitable preferred width of the dry film layer has already been discussed.

A useful embodiment of the claimed invention provides the ability to feather the edges of the applied dry film layer, so that the edge of the dry film layer is thinner than its center. This may be accomplished during the application of the dry film layer to the release layer. Spraying, printing, roll coating, or any of a number of techniques suitable for the application of ink or paint to a substrate may be used to accomplish this application process, so that the dry film layer on the release layer has feathered edges. An advantage of feathering an edge of the dry film layer is so that the edge of the applied film will not show through upon subsequently coating the substrate with one or more additional coating layers. Typically, no provision for this feature is used or needed for correction tape, since the dry paint in that application is not further coated with a liquid paint. The correction tapes used typically match the white color of the paper on which they are applied, whereas the dry film layer according to the invention need not exactly match the color of the substrate, since it will subsequently be coated with one or more liquid coating layers so that dry film applied, the stain, and the surrounding surface will all be of substantially even appearance. The dry film may be applied by many techniques, as mentioned above. If printing is the selected process, it may be accomplished by a variety of techniques including gravure, slot printing, silk screening, flexographic, ink jet, wide format ink jet, or other methods used in printing.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

A film from a "Paper Mate Liquid Paper Dryline Corrector" device, available from Sanford Corporation, Bellwood, Ill. 60104, was applied by hand to an interior wall over markings that had been made with a solvent-based black marker. There were three noted characteristics evident from this example:

1. When the correction film was applied over the ink mark, the ink was hidden completely where the correction film was applied.
2. When the correction film was applied to the surface of the wall the correction film could not be detected by touch. No edge could be felt; and
3. Once the correction tape was applied to the surface of the wall it could not be removed easily. It could not be peeled off or scratched off the surface without damage to the surface to which it was applied.

Example 2

A film from a "Paper Mate Liquid Paper Dryline Corrector" device was applied to an interior wall over tack holes and small nail holes. Once these blemishes were covered a new coat of liquid paint was applied. Several observations were made from this example:

1. Tack holes were covered completely by the correction film. There was no evidence of a hole in the surface.
2. Small nail holes needed to be smoothed flat before correction film was applied in order for the film to apply evenly and continuously and hide the blemish.
3. In this example one coat of water based flat paint "Sears Easy Living Brand" was applied over the hidden blemishes and upon drying the blemishes could no longer be detected.

Example 3

Dry films from a "Paper Mate Liquid Paper Dryline Corrector" device; a "BIC White Out Brand" device, available from BIC USA, Inc., Milford, Conn. 06460; and a "Tombow Brand" correction tape device, available from American Tombow, Inc., Lawrenceville, Ga. 30043, were applied vertically to cover a portion of seven horizontal marks that had been applied using seven colors of "Rose Art" brand water-based markers, available from Rose Art Industries, 800-272-9667. The films were also applied over a stubborn blue water-based ink mark (source unknown) that had been unsuccessfully painted over several times with liquid indoor architectural paints. After the correction tapes were applied the area was painted using the same paint that had been previously applied in Example 2. Several observations were made from this example:

1. The three films were not equal in ease of application and adhesion to the surface. The "BIC" product tended to tear and wrinkle and did not adhere to the surface as well as the others. The "Tombow Brand" showed slightly less adhesion than the "Paper Mate Brand".
2. All three of the films, upon application over the marks, covered the seven marks and the stubborn mark completely without show-through.
3. There were evident color differences in the shade of each of the films. The "BIC Brand" was bright white, the "Tombow Brand" was off-white, and the "Paper Mate Brand" had a more yellow appearance.
4. Once the films were painted over using the same water-based paint that had been originally applied to the wall, each film continued to hide all the marks.
5. The "Paper Mate Brand" was covered and the shape and color of the correction film could not be seen after one coat of paint. The "Tombow Brand" required two coats of paint to be hidden. Even after three coats of paint the "BIC Brand" was still detectable.

Example 4

Various inks and stains were used to make marks on a piece of painted wallboard. These marks included water-based ink, oil-based (solvent-based) ink, crayon, and lipstick. Each kind of ink and stain was applied fresh and then covered with each of the films described in example #3. In each case, the stains were covered completely and did not resurface when painted over. The performance of the films was compared to the performance of "Kilz II" water-based stain blocking primer, and "Valspar One and Only" water-based flat wall paint. Each of the dry films out-performed the liquid primer and the paint by blocking more of the stain color. The "Paper Mate Brand" film was undetectable after one coat of paint was applied.

Example 5

Demonstration of the stain-blocking capabilities, including feathering the edges.

The following latex was prepared:

To a 4 liter resin kettle containing

| | |
|---|---|
| 354 | g water |
| 58.3 | g of a 27% solids butyl acrylate seed latex (particle size = 27 nm) |
| 0.1 | g DISSOLVINE 4.5% H—FE from Akzo Nobel |

and maintained at 60 degrees Celsius while stirring, was fed over 30 minutes at 2.92 g/minute a pre-emulsion consisting of

| | |
|---|---|
| 393.8 | g water |
| 67.01 | g Rhodafac RS610A-25 available from Rhodia |
| 4.18 | g phosphate ester of 2-hydroxyethyl methacrylate |
| 283 | g styrene |
| 44.9 | g methacrylic acid |
| 431.2 | g 2-ethylhexyl acrylate |
| 33.50 | g ROHAMERE ® 6844 available from Degussa |
| 15.72 | g butyl methacrylate |
| 25.05 | g methyl methacrylate |
| 16.75 | g iso-octyl mercaptopropionate |

In addition, the following initiator streams were begun and fed separately and gradually over 300 minutes:

| | |
|---|---|
| 5.57 | g water |
| 3.33 | g t-butyl hydroperoxide (70% aqueous) |
| and | |
| 58.5 | g water |
| 2.09 | g isoascorbic acid |

When the pre-emulsion feed above was exhausted, the remainder of the monomer pre-emulsion was fed at 5.85 g/minute until exhausted (about 210 minutes).

This was followed by an 8.20 g water rinse.

Immediately following the pre-emulsion feed, the following initiator feeds were begun and fed portion wise over 1 hour:

| | |
|---|---|
| 2.5 | g water |
| 0.48 | g t-butyl hydroperoxide |
| and | |
| 2.76 | g water |
| 0.25 | g isoascorbic acid |

The latex reaction mixture was then cooled and the following were added:

| | |
|---|---|
| 20.0 | g of 19% aqueous ammonia |
| 4.6 | g Proxel ® BD (available from Avecia) |
| 12.1 | g water |

The final latex was determined to have solids of 47.0%. The Tg was estimated at zero degrees Celsius.

A paint was prepared from the latex above.

The following pigment grind was prepared:

All of the liquid ingredients listed in Table 1 were placed in a Cowles mixer. The pigments were added in the order shown and ground to yield a >7 on a Hegeman gauge. The grind was transferred to a vessel equipped with an overhead mixer, and the latex described above, Texanol, ethylene glycol, Drewplus L-475, and DSX 1514 were added.

TABLE 1

| | | |
|---|---|---|
| Grind | | |
| Water | | 11.95 |
| Surfynol CT 131 | Dispersant | 2.22 |
| Surfynol 104DPM | Wetting/leveling agent | 0.44 |
| Surfynol DF-210 | Defoamer | 0.17 |
| TiPure R-706 | Titanium dioxide | 18.43 |
| Omyacarb UF | Calcium carbonate | 18.43 |
| Minex 7 | Nepheline syenite | 18.85 |
| Letdown | | |
| Latex above | | 119.77 |
| Texanol | | 3.70 |
| Ethylene Glycol | | 5.26 |
| Drewplus L475 | Defoamer | 0.39 |
| DSX 1514 | Associative thickener | 0.39 |

Surfynol is a trademark of Air Products and Chemicals, TiPure is a trademark of E.I. DuPont DeNemours Co., Omyacarb is a trademark of Omya, Inc., Minex is a trademark of Unimin Specialty Minerals, Inc., Texanol is a trademark of Eastman Chemical Co., Drewplus is a trademark of Drew Industrial Div., Ashland Chemical Ind., DSX is a trademark of Cognis, Inc.

The paint was thinned with deionized water to spray viscosity, and then sprayed onto a sheet of release paper (22×29 cm, Form RP-1 K, available from Byk-Gardner, Columbia, Md. 21046). The sprayer used was a Badger hobby sprayer, available from Badger Air Brush Co., Franklin Park, Ill. 60131. The spray pattern on the release paper was a strip across the width of the paper, thinner at the edges than at the center of the strip. The edges were feathered due to the natural spray pattern. This spray pattern was obtained by movement of the sprayer uniformly across the panel from side to side multiple times until the desired wet film thickness (as measured by a Guardco wet film thickness gauge) was obtained. Film thicknesses ranged from 1 to seven mils (25 to 175 micrometers). Since the solids of the liquid coating was about 35% after thinning with water, the dry film thickness was near 35% of that of the wet film. The width of each of the spray patterns was about 4 centimeters.

The partially dry paint film (after drying for about 1 hour under ambient conditions) was over sprayed with a thin coating of adhesive latex (Eastman Eastarez® 2050, available from Eastman Chemical Company, Kingsport, Tenn.), also thinned with water to suitable spray viscosity. The combined layers were allowed to dry under ambient conditions overnight.

The stain blocking capabilities of the dry film on release paper was tested by the following ink test.

A stripe of water-soluble ink was transferred onto a dried coating of Behr No. 1050 Ultra Pure White Interior Flat wall paint applied with a 7 mil Bird applicator supported on a 22×29 cm Leneta chart. The ink applied was allowed to dry for at least one week. Then a piece of the dry film layer on release layer prepared above which had been cut from the sheet of release paper was contacted over a part of the ink band, so that the sticky side was toward the ink and paint surface. Light rubbing pressure on the back of the release paper caused the dry film layer and adhesive layer to transfer to the inked paint surface. Thus the dry film layer was transferred such that it covered part of the stripe of ink, and in addition, both feathered edges and cut edges were present in the transferred paint. The cut edges were placed on the white painted area, whereas the feathered edges covered both ink and white painted area. The feathered edges were invisible over the white painted area, whereas a visible edge was present at the cut edge. The cut edge could be felt even for the thinnest films.

For comparison, just beside the dry coating, now stuck to the inked paint surface, was applied a wet film of white pigmented Kilz Premium stain blocking paint (available from Masco, Inc., 21001 Van Horn Road, Taylor, Mich. 43130) using a 3 mil Bird bar, so that the Kilz paint also covered the same ink stripe. The applied Kilz paint rapidly (within one minute) took on the color of the ink stripe just under the applied Kilz paint. The Kilz Premium paint was allowed to dry at 50% relative humidity for 4.5 hours. Once dry, and using a No. 80 wire wound rod coating applicator, a topcoat of Behr 1050 Ultra Pure White Interior Flat paint was applied over both the dry transfer paint and the dry Kilz Premium paint (and also in-between) which were in turn both covering the ink stripe. This coating was allowed to dry overnight at 50% humidity.

The color was observed after overnight drying for each applied paint, the dry film layer applied according to the invention, and the wet applied Kilz® Premium control paint. The portion of the ink stripe observed for color was that covered by both the Behr 1050 topcoat and the applied dry paint film. For comparison, the ink stripe color was observed also where it was covered only by the Behr 1050 topcoat. The table below shows the relative color of each, relative to the blue ink color. Where there is no primer or dry film, but only Behr topcoat, the color rating is eight, as shown in Table 2.

TABLE 2

| Inked Panel Application of Stain Blocking Paints and Applied Behr 1050 Topcoat | Color Intensity (10 greatest, 0 not visible) |
|---|---|
| Blue Ink Color Control - no coating over ink | 10 |
| Control - Behr 1050 topcoat only | 8 |
| Dry transfer paint - 1 mil wet | 2 |
| Dry transfer paint - 2 mils wet | 1 |
| Dry transfer paint - 7 mils wet | 0.5 |
| Kilz Premium (applied as a liquid) | 5 |

Even though the values for color are greater than zero for all of the paints, no evidence of bleed-through was apparent for the paints applied as dry films. Only the hiding value of the dry film layer (governed by its thickness and pigment level) was believed to allow any color to show through the dry film layer.

The feathered edge of the dry film layer was still invisible over the non-inked painted surface, which was covered by the now dry but wet-applied Behr 1050 topcoat. However, the cut edge of the dry-applied paint was still visible through the Behr 1050 topcoat. It was most evident when light was cast such that a shadow was produced by the thin edge. Even the thinnest (1 mil wet applied) dry film layer cut edge was visible, whereas not even the thickest (7 mil wet applied) dry film layer feathered edge was visible under the Behr 1050 topcoat.

Example 6

An all-acrylic latex was used to prepare a dry film coated with adhesive, similar to that above. The latex used was Hydreau® AR 110, available from Eastman Chemical Company, and it was blended with 1.0 phr of a thickener solution prepared by diluting with water RM-8 associative thickener from Rohm and Haas to 3.6% solids.

Release paper (Form RP-1 K Release Paper, available from Byk-Gardner USA) was coated by drawdown with the latex containing 8 phr Texanol ester alcohol solvent (based on latex solids), using a 3 mil Bird bar. The coating was allowed to dry overnight, then coated with Estarez 2050 adhesive latex using a 1 mil Bird bar to provide an adhesive later atop the acrylic latex. When dry, the film-adhesive composite was transferred (by applying pressure to the back side of the release paper ) to a Leneta chart which had been pre-coated with bands of water-soluble inks similar to those used in Eberhard Faber 4000 series water-based markers available from Sanford Company (six different colors of ink were used: blue, red, green, aqua, magenta, and yellow). Beside the dry film-adhesive composite was applied a wet film (also using a 3 mil Bird bar) of Kilz® Premium stain blocking paint (available from Masterchem Industries, Inc., Imperial, Mo. 63052). Both the dry film-adhesive composite and the Kilz Premium paint covered all six ink colors.

The inked paper, including the transferred dry film-adhesive composite, was covered by the dry film layer, which was then coated using a Number 80 wirewound drawbar with Behr Premium 1050 paint. After drying for 4 hours, the top-coated card was evaluated and compared to the control "wet applied" paint, Kilz Premium paint drawdown. The AR-110 primer limited color of the ink to less than that of the Kilz Premium paint that was applied wet, even though the AR-110 primer used contained no pigment which would contribute to hiding.

Example 7

To illustrate the many types of commonly used coatings resins that are suitable in this application, and using an evaluation procedure similar to that in Example 6 above, the following resins were evaluated with the results shown in the table below.

Resin A:

An amine-cured epoxy resin (cationic in nature) was prepared by blending the following ingredients sequentially:

30 g Jeffamine® D400 polyoxyalkylene amine, available from Huntsman Performance Chemicals, Conroe, Tex. 77305;

6 g Ethyleneamine E-100 poly(ethylenepolyamine), available from Dow Chemical, Midland, Mich. 48674; and 100 g EPON® Resin 828, bisphenol A/epichlorohydrin derived liquid epoxy resin, available from Resolution Performance Products, Houston, Tex. 77210-4500

A dry film-adhesive composite on release paper was prepared using a 1 mil Bird bar for the partially cured (the cure was accelerated by warming to about 50° C. for 10 minutes to increase the viscosity) epoxy resin composition above, allowing the resin to cure overnight, followed by a drawdown of Eastarez 2050 waterborne adhesive latex using a 1 mil Bird bar.

Resin B:

Neorez® 9699 waterborne urethane, available from Zeneca Resins, 730 Main Street, Wilmington, Mass. 01887, to which was blended 4.3 phr of a 3.6% aqueous solution of Acrysol® RM-8 associative thickener (available from Rohm and Haas) was used to make a dry film on release paper using a 3 mil Bird bar. The resin was allowed to dry for at least 3 hours. Then an adhesive coating of Eastarez 2050 was applied with a 1 mil Bird bar to cause adhesion in the subsequent transfer to inked paper substrate.

Resin C:

Aquamac 580 vinyl acetate-acrylic latex available from Eastman Chemical Company to which was blended 0.98 phr of a 3.6% aqueous solution of RM-8 associative thickener was applied with a 3 mil Bird bar and allowed to dry for at least 3 hours. This was followed by an application of Eastarez 2050 with a 1 mil Bird bar.

Resin D:

Sancure® 825 waterborne urethane, available from B. F. Goodrich Performance, Cleveland, Ohio, 44141-3247, to which was blended 3.9 phr of a 3.6% aqueous solution of RM-8 associative thickener was applied with a 3 mil Bird bar to release paper and then allowed to dry at least 3 hours. This was followed by Eastarez 2050 applied with a 1 mil Bird Bar, and allowed to dry.

Resin E:

A latex of a polymer composed of the monomers 2-ethyl hexyl acrylate (76.5%) acrylonitrile (20%) and methacrylic acid (2%) and 2-phosphatoethyl methacrylate (0.5%) blended with 2.7 phr of a 3.6% aqueous solution of RM-8 associative thickener was drawn down on release paper using a 3 mil Bird bar. The resin was allowed to dry for at least 3 hours. No adhesive resin was needed to transfer the latex, since its Tg was minus 20° C. which led to a significantly tacky film.

Resin F:

RHOPLEX® SG-30 (all acrylic latex available from Rohm and Haas, Philadelphia, Pa.) was drawn down on release paper using a 2 mil Bird bar, and allowed to dry for at least 3 hours, and then coated further with using a 1 mil Bird bar with Eastarez 2050.

Resin G:

Zinsser Bullseye Shellac (available from W. M. Zinsser and company, Somerset, N.J. 08875) to which was added 9.6 phr Byk 301 (available from Byk-Chemie USA, Wallingford, Conn. 06492-7651), was drawn down on release paper using a 3 mil Bird bar and allowed to dry for at least 3 hours. Then atop the clear shellac film was drawn down with a 1 mil Bird bar Eastarez 2050, which was also subsequently allowed to dry.

The blue ink color visible in the areas over the primer dry films was rated relative to the liquid applied Kilz Premium primer drawdown (the other colors were transmitted similarly, but the rating was done only over the blue ink area for consistency). The ratings are shown in Table 3.

TABLE 3

| Resin of Example 7 | Result (0 complete color block, 10 no block) |
|---|---|
| A | 1 |
| B | 1* |
| C | 1 |
| D | 0.5 |
| E | 1 |
| F | 1 |
| G | 1 |
| No primer | 8 (some minimal blocking by topcoat) |
| Control (Kilz Premium, liquid) | 3 |

*Even though cracks appeared in the topcoat, the primer coating still blocked ink in the uncracked places very effectively.

For comparison with the dry films above, the liquid paints from examples C and D were applied directly to similar ink charts, dried at least 4 hours, then coated with the same topcoat as above. The color reading for the liquid applied C was 9-10, whereas the liquid applied D was 3 (approximately equivalent to the optimized liquid Kilz Premium paint). Neither wet applied result was as good at ink blocking as its corresponding dry film.

Water-soluble Resin H

To illustrate the use of a relatively poorly performing water-soluble polymer, dry films were prepared from water-soluble polymers. Poly(acrylic acid) (Mw=ca. 5000, 50% in water, available from Aldrich Chemical Company, Milwaukee, Wis. 53233) was blended with 1% of Surfynol 104A acetylenic diol (available from Air Products) and 0.1% of Zonyl® FSN (available from du Pont, Wilmington, Del.). Using a 2 mil Bird bar, a thin film was formed on release paper. It was allowed to dry at room temperature overnight to form a clear, dry film. Then a drawdown over this film with Eastarez 2050 (diluted 1:10 with water) was made with a 1 mil Bird bar to provide adhesive properties to the film surface. The film was transferred to an inked chart as in previous examples, then the chart including the dry film transferred was coated with Behr 1050 paint using a No. 80 wire wound draw bar. The paint was allowed to dry for 4 hours, then rated versus a control primer film which had been applied wet to the inked chart and allowed to dry. The color rating for the blue ink was 9 (appearance similar to that where no primer was present). This polymer is believed to be both high enough in water solubility and low enough in molecular weight to allow sufficient water permeability (and therefore ink stain permeability) so as not to retard stain migration through the dry film, resulting in the poor performance exhibited. This polymer may nonetheless have satisfactory performance characteristics when a solvent-borne liquid coating is to be subsequently applied.

Example 8

This example illustrates further examples of coating resins that are useful in forming a dry film layer. Herein and in the following examples we present examples of the use of alkyd, polyester and adhesive resins.

Resin A (alkyd):

The following ingredients were blended:

| | |
|---|---|
| 25.2 | g Duramac HS 57-5816 (90% solids alkyd available from Eastman Chemical Company) |
| 0.052 | g 12% Cobalt Hexcem ® (available from OMG Americas) |
| 0.20 | g 12% Zirconium Hexcem (available from OMG Americas) |
| 0.751 | g BYK 301 (available from BYK-Chemie USA) |

Resin B (polyester):

| | |
|---|---|
| 18.07 | g of a polyester prepared from neopentyl glycol/trimethylol propane/isophthalic acid/Adipic acid (80% solution in xylene; Eastman Chemical Company polyester starting formulation HS-3-1N) |
| 1.57 | g Cymel ® 303 aminoplast resin available from Cytec, Inc. |
| 0.26 | g Nacure ® 5076 dodecylbenzene sulfonic acid in isopropanol solution from King Industries. |

This resin blend contained about 10.9 phr aminoplast resin based on polyester.

Resin C (Polyester):

| | |
|---|---|
| 6.03 | g of polyester solution B above |
| 5.94 | g of additional polyester from B above |
| 1.87 | g xylene |

This resin blend contained about 5.2 phr aminoplast resin based on polyester.

Resin D:

A thickened adhesive solution was prepared as shown by combining the ingredients below sequentially with stirring:

| | |
|---|---|
| 32.4 | g EASTAREZ ™ 2050 (available from Eastman Chemical Company) |
| 0.20 | g concentrated ammonium hydroxide (28-30%) |
| 0.79 | g UCAR ™ Polyphobe ™ 104 |

The pH of the solution was measured at 9.01 following the addition of the ammonia.

Example 9

This example illustrates the use of solvent-borne, cured alkyd and polyester films as dry film layers, and also as stain blocking paints.

Alkyd of Example 8-A:

Using a Bird bar with a 75-micrometer (3 mil) gap, a drawdown was made on release paper (Form RP-1K Release Paper, available from Byk-Gardner USA) using the alkyd composition of Example 8-A. Curing under baked conditions of 1 hour at 60° C. resulted in a wrinkled film. A similar drawdown was made using a 25-micrometer gap drawbar and it cured under similar conditions, with no wrinkling, to give a tack-free film. Using a Bird applicator, a thin film of adhesive (from Example 8-D) was spread on the top of the cured alkyd film. It was allowed to flash at room temperature for about 10 minutes, and then baked at 60° C. for 15 minutes to dry the adhesive.

The dry film composite (dry film layer plus adhesive layer on release layer) was first trimmed on the edges to remove imperfections from the drawdown, and then contacted with and transferred (using slight applied to the back of the release paper) to an ink stain test card prepared from a Leneta card covered with a dried paint coating (Behr 2050, about 3 mils dry film thickness) which had cured for over one month at room temperature, which had also contained aged (at least 7 days), colored, water-soluble ink lines on the paint surface. The ink lines covered with the dry film-adhesive composite were red, blue, green and yellow inks, similar to those used in water-soluble marker pens. Adhesion of the dry film layer to the test card painted substrate was excellent. Over the dry film layer and the adjacent uncoated area of the ink test card was drawn down a layer of Behr 1050 paint using a No. 80 wire wound rod paint applicator. The paint was allowed to dry for 4 hours and then evaluated for ink blocking, which was complete. No ink showed on the surface of the newly dried paint topcoat, and only a trace of color was visible due to the insufficient hiding of the Behr 1050 topcoat and clear primer layer.

Polyester of Example 8-C, having 5.2 phr Curing Agent

This example illustrates a partially cured polyester that forms a dry film layer, which transfers to a substrate without the use of an adhesive layer.

Using a Bird bar with a 3 mil (75 micrometer) gap, a drawdown was made of about 5 cm in width on release paper (Form RP-1K Release Paper, available from Byk-Gardner USA) using the polyester blend of Example 8 containing 5% Cymel 303 (Example 8-C). The drawdown was cured at 100° C. for 30 minutes to form a lightly crosslinked film, or at 150° C. for 45 minutes. The coatings were still tacky and somewhat rubbery after cooling to room temperature.

The drawdown (dry film layer) cured at 150° C. was pressed onto a substrate coated with about 3 mils thickness of Behr 1050 paint (which had been dried for at least one month, and which then had 13 different colored inks drawn across it to represent ink stains, and then aged at least 7 days). The tacky dry film layer transferred easily from the release layer with only mild pressure by rubbing the back of the release paper with the finger. A wet applied, pigmented, stain blocking paint (Kilz Premium) was applied adjacent to the newly transferred dry paint, also covering the inked and painted substrate. The wet paint was allowed to dry overnight (16 hours). Both coatings (dry paint film and Kilz Premium paint film, now dry) were coated with a topcoat of wet Behr 1050 paint, using a wire wound No. 80 paint application rod. The areas of the original unprimed inked and painted substrate were also covered with the wet paint so that a comparison might be made of how well the dry film layer and the Kilz Premium compared to the uncoated inked dry Behr 1050 paint original surface.

After the topcoat paint had dried for six hours, a judgment of how much color was at the surface of the newly applied topcoat was made. The areas where there was no dry film layer or Kilz Premium paint subsurface showed severe color bleed through. Approximately 90% of the color was transmitted through the newly applied paint topcoat.

The Kilz Premium paint allowed only a modest amount of ink through to the surface, minimizing the color by about 80% (20% of the original color intensity). In addition, the ink lines in the Kilz Premium primed area had widened significantly and were as wide as those in the unprimed area. The pigment in the primer helped to hide some of the color.

The unpigmented dry paint film layer blocked a similar level of the color to the pigmented Kilz Premium, leaving only about 20% of the color visible at the newly applied surface; however, the ink lines were still their original width. No diffusion of the ink took place. This indicates that the only ink showing at the surface was due to poorer hiding of the unpigmented cured polyester dry film, and that the original ink lines showed through the topcoat to reveal 20% of their original intensity.

The area of the Behr 1050 coated substrate under where the edges of the dry applied paint film lay were clearly visible using a light shown at a small angle relative to the surface. Since the edges of the film were not feathered, this edge was readily apparent and could also be felt with the finger even after the topcoat had been applied and dried.

Polyester of Example 8-B, having 10.9 phr Curing Agent

This example illustrates the curing to a tack free film of a polyester-melamine resin coating film layer, then applying an adhesive layer to aid in its transfer to a substrate.

Using a Bird bar with a 75 micrometer (3 mil) gap, a drawdown was made of about 5 cm in width on release paper (Form RP-1K Release Paper, available from Byk-Gardner USA) using the polyester blend of Example 8 containing 10.9 phr Cymel 303 (Example 8-B). After allowing the solvent to flash at room temperature for 15 minutes, the drawdown was cured at 150° C. for 30 minutes to form a crosslinked dry film layer having no evidence of tackiness on its surface. The top of the dry film layer was then coated with about 75 micrometers thickness of the wet adhesive from Example 8-D, and allowed to dry at room temperature for 10 minutes, then at 60° C. for 15 minutes.

The drawdown composite (cured polyester dry film layer and adhesive layer) prepared above was trimmed to remove rough edges and was then pressed onto a substrate coated with about 3 mils thickness of Behr 1050 paint (which had been dried for at least one month, and which then had 6 different water-soluble, colored inks drawn across it to represent ink stains, and then aged at least 7 days).

The tacky film composite transferred easily from the release layer with only mild pressure by rubbing the back of the release paper with the finger. The dry film composite adhered to the inked painted surface was then further coated with a topcoat of wet Behr 1050 paint, using a wire wound No. 80 paint application rod. The areas of the original unprimed inked and painted substrate were also covered with the wet paint so that a comparison might be made of how well the dry film compared to the uncoated inked dry Behr 1050 paint original surface.

After the topcoat paint had dried for at least four hours, a judgment of how much color was at the surface of the newly applied topcoat was made. The areas where there was no dry film composite subsurface showed severe color bleed through. Approximately 90% of the color was transmitted through the newly applied paint topcoat.

The unpigmented dry paint film composite masked most of the ink color, leaving only about 20% of the original color intensity visible at the newly applied surface. This visible color was believed due to the lack of hiding of the topcoat and clear dry film composite layer. No ink diffusion was observed for the dry film composite covered area, but where the ink had diffused through the topcoat Where no dry film composite was present, significant widening of the ink bands was observed.

Example 10

Dried Primer Film on Release Paper—Effect of Tg.

Aqueous coating formulations utilizing styrene-acrylic latexes with glass transition temperatures of 18° C., 10° C., and 0° C. were prepared. The formulations are shown in Table 4. The latexes used were the same composition as in Example 5 recipe above (having a Tg of about 0° C.) except that the ratio of 2-ethylhexyl acrylate to styrene was changed, resulting in differences in Tg. The latex used with the Tg=0° C. was that used in Example 5.

For the grind, all of the liquid ingredients were placed in a Cowles mixer. The pigments were added in the order shown and ground to yield a >7 on a Hegeman gauge. The grind was transferred to a vessel equipped with an overhead mixer, and the latexes, Texanol, ethylene glycol, Drewplus L475, and DSX 1514 were added.

TABLE 4

| | | A | B | C |
|---|---|---|---|---|
| Grind | | | | |
| Water | | 12.17 | 11.84 | 11.95 |
| Surfynol CT 131 | Dispersant | 2.26 | 2.20 | 2.22 |
| Surfynol 104DPM | Wetting/leveling agent | 0.45 | 0.44 | 0.44 |
| Surfynol DF-210 | Defoamer | 0.17 | 0.17 | 0.17 |
| TiPure R-706 | Titanium dioxide | 18.76 | 18.25 | 18.43 |
| Omyacarb UF | Calcium carbonate | 18.76 | 18.25 | 18.43 |
| Minex 7 | Nepheline syenite | 19.19 | 18.67 | 18.85 |
| Letdown | | | | |
| 18° C. Latex | | 118.33 | | |
| 10° C. Latex | | | 120.54 | |
| 0° C. Latex | | | | 119.77 |
| Texanol | | 3.77 | 3.66 | 3.70 |
| Ethylene Glycol | | 5.35 | 5.21 | 5.26 |
| Drewplus L475 | Defoamer | 0.40 | 0.39 | 0.39 |
| DSX 1514 | Associative thickener | 0.40 | 0.39 | 0.39 |

Surfynol is a trademark of Air Products and Chemicals, TiPure is a trademark of E.I. DuPont DeNemours Co., Omyacarb is a trademark of Omya, Inc., Minex is a trademark of Unimin Specialty Minerals, Inc., Texanol is a trademark of Eastman Chemical Co., Drewplus is a trademark of Drew Industrial Div., Ashland Chemical Ind., DSX is a trademark of Cognis, Inc.

The coatings were drawn down on silicone treated release paper (Form RP-1K, Byk-Gardner) with a #60 wire-wound rod and allowed to dry for 24 hours at 50% relative humidity and 72° F. Approximately 1.25 inch strips of each coating were cut from the release sheets. The strips were placed face down on ink test substrate, and pressure was applied to the strips to transfer the primer coating. The coating formulated with the lowest Tg transferred well to the ink substrate, whereas the others did not. The test panel was then coated with Behr 2050 Bright White Interior Eggshell using the #60 wire wound rod. After drying, the panel was evaluated for color bleed through the 2050 topcoat. Virtually no color was observed in the topcoat covering the stain blocking dry film layer, while severe color bleed was seen in the areas where no primer was applied.

Example 11

This example illustrates the successful application of a water-soluble polymer used in a stain blocking dry film layer.

Poly(vinyl alcohol), 80% hydrolyzed, average Mw=9000-10000, was dissolved in water to achieve a 50% solution. To this was added 1% of Surfynol® 104A acetylenic diol surfactant. This was drawn down on release paper using a 2 mil Bird bar on a smooth glass surface. To the film was applied with a 1 mil Bird bar an adhesive latex prepared from Eastarez 2050 diluted to 10% solids with water. When dried, the film composite was transferred (sticky side down) to a previously inked panel as before, but first using a razor blade to remove the film from the glass. The inked panel, including the dry film, was coated with a topcoat of Behr 1050 paint and allowed to dry for 4 hours. The results of the blue ink color were a rating of 2 to 3, relative to the poly(acrylic acid) of Example 7-H of only 9 (with 10 being no ink block).

For comparison, the adhesive used above was drawn down using a 1 mil Bird bar onto release paper. To achieve a good drawdown, 10.8 grams of a 3.6 wt.% solids solution of the RM-8 thickener was added to 20 g of Eastarez 2050 and 80 g water, so the comparison consists of a significant amount of added RM-8 polymer solids as well as that of the Eastarez 2050. The dry film was transferred to an ink stained chart as above, then topcoated with Behr 1050 and allowed to dry for 4 hours. The color result of 1 (good ink block) was informative. Even this thin film blocked ink stains. The case in which this adhesive was used to cause adhesion in the poly(acrylic acid comparative example) indicates that some polymers that are not good, water-resistant film formers can actually impact the good stain-blocking performance of the adhesive layer. In the other cases, the adhesive layer may be contributing to the ink blocking capabilities of the dry film composite.

The invention has been described in detail with reference to preferred embodiments, but it will be understood that variations and modifications can be effected within the spirit and scope of the invention. In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. A method of blocking a stain on a substrate to be painted, the method comprising the steps of:

contacting a stained portion of a substrate with a dry film composite comprising a dry film layer and a release layer, said stained portion comprising a mark, discoloration, or deposit;

applying pressure to the dry film layer to cause the dry film layer to adhere to the stained portion of the substrate and to at least a portion of the substrate adjacent the stained portion;

removing the release layer; and coating the substrate and the dry film layer with one or more liquid coating layers, wherein the substrate comprises one or more of a floor, ceiling, wall, decking, porch, door, door panel, molding, furniture, cabinet, cabinet door, cabinet frame, window frame, and cementitious material, or lumber suitable for making floors, ceilings, walls, decking, porches, doors, door panels, molding, furniture, cabinets, cabinet doors, cabinet frames, and window frames.

2. The method according to claim 1, wherein the dry film layer is provided with an adhesive layer that assists in adhering the dry film layer to the stained portion of the substrate and to the portion of the substrate adjacent the stain.

3. The method according to claim 1, wherein substantially all of the substrate is coated with the one or more liquid coating layers.

4. The method according to claim 1, wherein the substrate is substantially vertical.

5. The method according to claim 1, wherein the stain comprises a visible mark caused by one or more of: ink, crayon, lipstick, grease pencil, colored marker, smoke, water, or tannin.

6. The method according to claim 1, wherein the stain is hydrophilic.

7. The method according to claim 1, wherein the stain is lipophilic and would inhibit adhesion of an aqueous coating composition to the stained portion of the substrate.

8. The method according to claim 1, wherein the stain comprises a food residue.

9. The method according to claim 1, wherein the stain resides on the surface of the substrate.

10. The method according to claim 1, wherein the stain resides on the surface of a paint layer provided on the substrate.

11. The method according to claim 1, wherein the stain resides within a paint layer provided on the substrate.

12. The method according to claim 1, wherein the stain comprises one or more of: a dye, a conjugated organic compound, an aromatic color body, or a wood knot.

13. The method according to claim 1, wherein the stain is soluble in water or an organic solvent.

14. The method according to claim 1, wherein the stain comprises a clear or unpigmented oily or lipophilic substance that is not readily visible.

15. The method according to claim 1, wherein the stain comprises one or more of: mineral oil, petrolatum, or wax.

16. The method according to claim 1, wherein the dry film layer prevents migration of the stain to the subsequently applied one or more liquid coating layers.

17. The method according to claim 1, wherein the dry film layer prevents the subsequently applied one or more liquid coating layers from dissolving the stain.

18. The method according to claim 1, wherein the pressure is applied by a roller.

19. The method according to claim 1, wherein the pressure is applied by a spatula or other blade applicator.

20. The method according to claim 1, wherein the pressure is applied by hand.

21. The method according to claim 1, wherein the pressure is applied uniformly across the surface of the dry film layer.

22. A method of blocking a stain on a substrate to be painted, the method comprising the steps of:

contacting a stained portion of the substrate with a dry film composite comprising a dry film layer and a release layer, said stained portion comprising a mark, discoloration, or deposit;

applying pressure to the dry film layer to cause the dry film layer to adhere to the stained portion of the substrate and to at least a portion of the substrate adjacent the stained portion;

removing the release layer; and coating the substrate and the dry film layer with one or more liquid coating layers, wherein the substrate comprises a painted wall.

23. A method of blocking a stain on a substrate to be painted, the method comprising the steps of:

contacting a stained portion of the substrate with a dry film composite comprising a dry film layer and a release layer, said stained portion comprising a mark, discoloration, or deposit;

applying pressure to the dry film layer to cause the dry film layer to adhere to the stained portion of the substrate and to at least a portion of the substrate adjacent the stained portion;

removing the release layer; and coating the substrate and the dry film layer with one or more liquid coating layers, wherein the substrate comprises a plastered wall.

24. A method of blocking a stain on a substrate to be painted, the method comprising the steps of:

contacting a stained portion of the substrate with a dry film composite comprising a dry film layer and a release layer, said stained portion comprising a mark, discoloration, or deposit;

applying pressure to the dry film layer to cause the dry film layer to adhere to the stained portion of the substrate and to at least a portion of the substrate adjacent the stained portion;

removing the release layer; and coating the substrate and the dry film layer with one or more liquid coating layers, wherein the dry film layer is provided with one or more feathered edges.

* * * * *